United States Patent
Thompson et al.

(10) Patent No.: US 6,752,015 B2
(45) Date of Patent: Jun. 22, 2004

(54) FLUID FLOW DEVICE HAVING REDUCED FLUID INGRESS

(75) Inventors: David J. Thompson, Livonia, MI (US); Robert E. Belke, Jr., West Bloomfield, MI (US); Edward P. McLeskey, Whitmore Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 46 days.

(21) Appl. No.: 10/253,190

(22) Filed: Sep. 24, 2002

(65) Prior Publication Data

US 2004/0055376 A1 Mar. 25, 2004

(51) Int. Cl.[7] .............................................. G01F 1/68
(52) U.S. Cl. ................................................... 73/204.22
(58) Field of Search ....................... 73/204.22, 204.23, 73/204.24, 204.25, 204.26, 204.27

(56) References Cited

U.S. PATENT DOCUMENTS

| | | |
|---|---|---|
| 4,011,087 A | 3/1977 | Short |
| 4,913,930 A | 4/1990 | Getson |
| 5,201,221 A | 4/1993 | Forgacs et al. |
| 5,313,832 A | 5/1994 | Stephan et al. |
| 5,487,792 A | 1/1996 | King et al. |
| 5,830,372 A | 11/1998 | Hierold |
| 6,012,432 A | 1/2000 | Igarashi et al. |
| 6,037,043 A | 3/2000 | Lehner et al. |
| 6,066,197 A | 5/2000 | Bristol et al. |
| 6,126,730 A | 10/2000 | Yoshida et al. |
| 6,139,758 A | 10/2000 | Tu |
| 6,190,779 B1 | 2/2001 | Heimann et al. |
| 6,308,680 B1 * | 10/2001 | Prior ...................... 123/195 R |
| 6,348,533 B1 | 2/2002 | Kishimoto et al. |
| 6,378,365 B1 | 4/2002 | Tu |
| 6,446,597 B1 * | 9/2002 | McAlister ................... 123/297 |

FOREIGN PATENT DOCUMENTS

| | | |
|---|---|---|
| EP | 0 323 694 A2 | 10/1988 |
| EP | 1 120 634 A2 | 1/2001 |
| EP | 1 310 773 A2 | 9/2002 |
| GB | 2 380 800 A | 8/2002 |

* cited by examiner

*Primary Examiner*—Edward Lefkowitz
(74) *Attorney, Agent, or Firm*—Brinks Hofer Gilson & Lione

(57) ABSTRACT

The present invention involves a device for detecting a condition of a flowing fluid within a vehicle having reduced sulfur ingress. The device includes a base plate having a receiving surface and a circumferential edge and a printed circuit board disposed on the receiving surface of the base plate. The device further includes a housing having peripheral side walls attaching to the receiving surface adjacent the circumferential edge to define a peripheral interface enclosing the printed circuit board within the housing. The device further includes an adhesive material disposed at the interface to adhere the housing to the base plate. The adhesive material has a predetermined thermal expansion coefficient and a predetermined elastic modulus to reduce fluid ingress through the interface and to accommodate thermal expansions of the base plate and the housing.

20 Claims, 3 Drawing Sheets

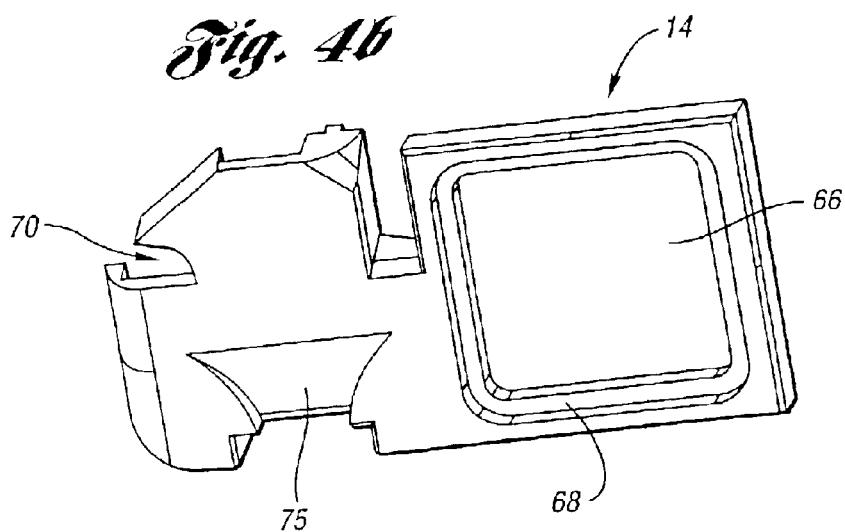
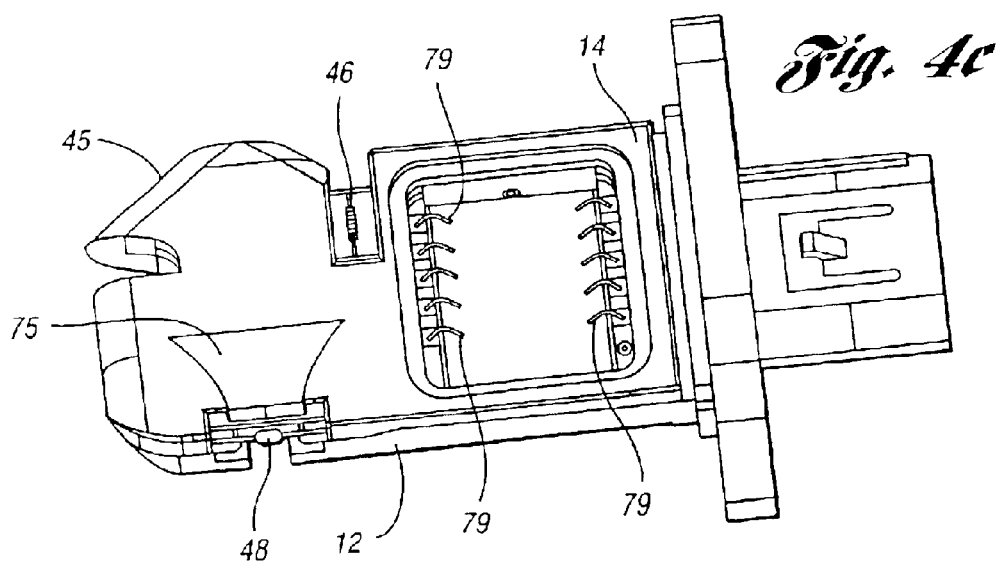
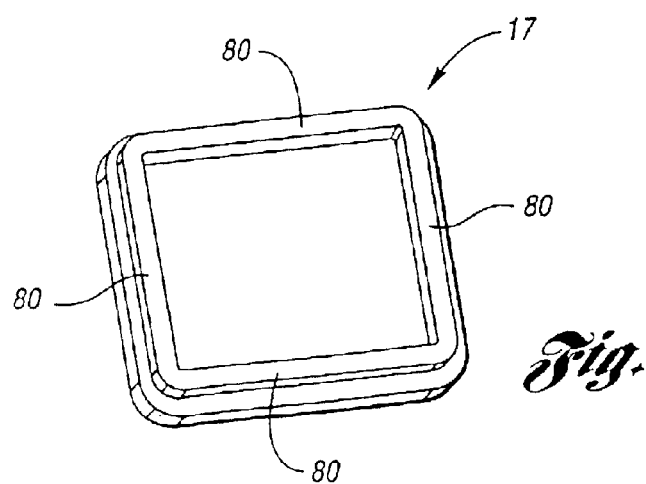

US 6,752,015 B2

FLUID FLOW DEVICE HAVING REDUCED FLUID INGRESS

BACKGROUND OF THE INVENTION

The present invention relates to mass fluid flow devices and methods of reducing contaminant, fluid ingress into mass fluid flow sensors.

Internal combustion engines today include electronic controls to provide a desired engine operation. Typically, the electronic control systems include a primary control unit for processing control algorithms and a variety of sensors for providing control signals to the primary control unit. One sensor for achieving a desired engine control is a mass fluid flow sensor, e.g., a mass air flow sensor, for measuring air intake into an internal combustion engine. Typically, a mass fluid flow sensor includes a printed circuit board disposed therein for determining fluid flow within a vehicle.

The mass fluid flow measurement should be accurate in order to provide a desired engine operation. One problem that manufacturers have experienced is related to reducing contaminant fluids from ingressing and contacting conductive material of the printed circuit boards in the mass fluid flow sensors. For example, it has been found that rubber hoses used in vehicles are outgassing sulfur and sulfur compounds. The sulfur becomes airborne and may react with copper and silver. When sulfur reacts with aluminum, for example, aluminum sulfide is formed. It is known that aluminum sulfide has a resistive characteristic and is not conductive. However, both aluminum and silver are materials used on thick film substrates for printed circuit boards or circuit modules. Thus, in many situations, sulfur which ingresses and contacts aluminum, for example, of a printed circuit board may result in the formation of aluminum sulfide. Thus, in such a situation, the printed circuit board may be undesirably altered or shorted when aluminum sulfide is formed thereon.

In these situations, outgassed sulfur typically ingresses into the mass fluid flow sensor through a seal between two materials, for example, metal and plastic. This may occur after the seal has experienced conditions of fluctuating temperatures wherein thermal expansions have occurred between the materials of the seal. Moreover, the adhesive used to seal the materials may have degraded, reducing its sealing properties to allow contaminants such as sulfur to ingress therethrough.

BRIEF SUMMARY OF THE INVENTION

Thus, it is an aspect of one embodiment of the present invention to provide a mass air flow device having reduced contaminant ingress therethrough.

It is another aspect of the present invention to provide a method of reducing contaminant fluid ingress into the device to reduce corrosion of a printed circuit board within the device.

It is yet another aspect of the present invention to provide a device for detecting a condition of a flowing fluid within a vehicle. The device comprises a base plate having a receiving surface and a circumferential edge. The base plate is made of a first material having a first coefficient of thermal expansion. The device further includes a substrate having a printed circuit, wherein the substrate is disposed on the receiving surface of the base plate.

The device further includes a housing including a cover and peripheral side walls extending therefrom. The side walls attach to the receiving the surface adjacent the circumferential edge to define a peripheral interface enclosing the substrate within the housing. The housing is made of a second material having a second coefficient of thermal expansion. The device further includes an adhesive material disposed at the interface between the circumferential edge and the peripheral side walls to adhere the housing to the base plate. The adhesive material has a predetermined thermal expansion coefficient and a predetermined elastic modulus to reduce fluid ingress through the interface and to accommodate thermal expansions of the first and second materials.

Further aspects, features and advantages of the invention will become apparent from consideration of the following description and the appended claims when taken in connection with the accompanying drawings.

BRIEF DESCRIPTION OF THE DRAWINGS

FIG. 4b is an outside perspective view of the housing with the housing cover installed thereon;

FIG. 4c is a perspective view of the housing with the housing cover installed; and FIG. 5 is a perspective inside view of a secondary cover of the housing in accordance with one embodiment of the, present invention.

DETAILED DESCRIPTION OF THE INVENTION

Figure 1:
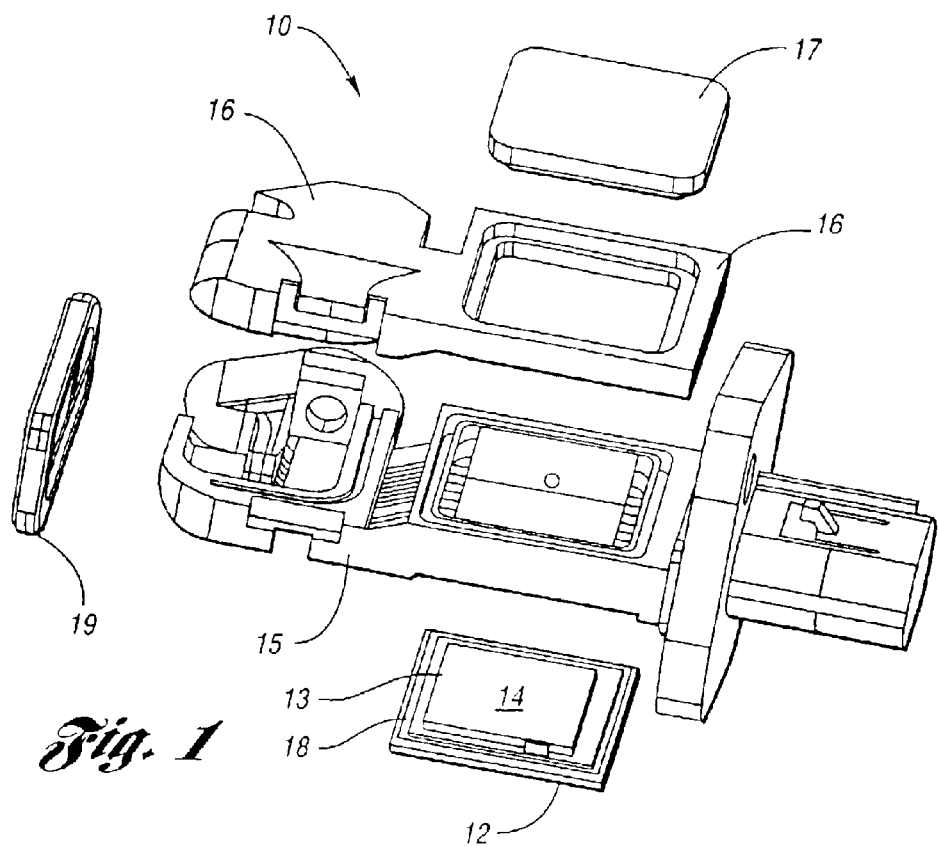
FIG. 1 is an exploded view of a mass fluid flow sensor in accordance with one embodiment of the present invention.

FIGS. 1 and 2 illustrate exploded and perspective views of a mass fluid flow sensor 10 having reduced fluid ingress for calculating an amount of fluid flowing in a duct in accordance with one embodiment of the present invention. One application or use for sensor 10 is for measuring an amount of air inducted into an internal combustion engine (not shown). However, the present invention contemplates other uses and application for the sensor. For example, the sensor may be used to calculate an amount of any other suitable fluid flowing through a duct (other than an air intake duct of an internal combustion engine). Thus, the sensor may be a device for detecting a condition of a flowing fluid within a vehicle.

In accordance with one embodiment of the present invention, mass fluid flow sensor 10 generally includes a base plate or an electronics cover 12, a substrate 13 having a circuit module 14 adhered on the base plate 12, a housing 15 matingly sealing to the base plate 12 and having a housing cover 16 and a secondary housing cover 17, an adhesive material 18 adhering the base plate 12 and the housing 15, and a gasket 19.

Figure 2A:
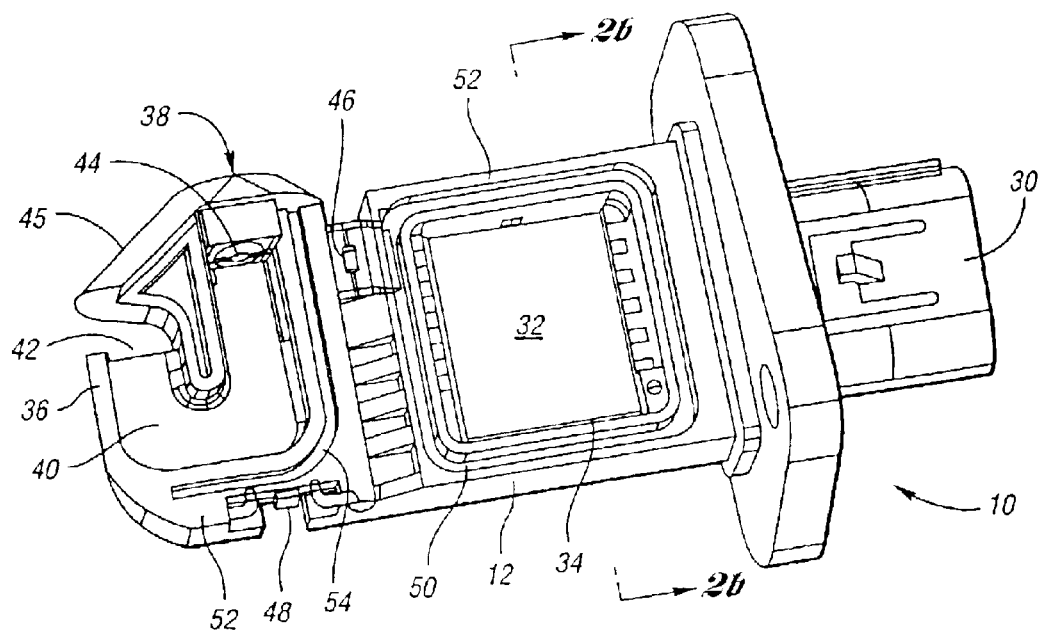
FIG. 2a is a perspective view of a mass fluid flow sensor of FIG. 1 in accordance with one embodiment of the present invention.
Figure 2B:
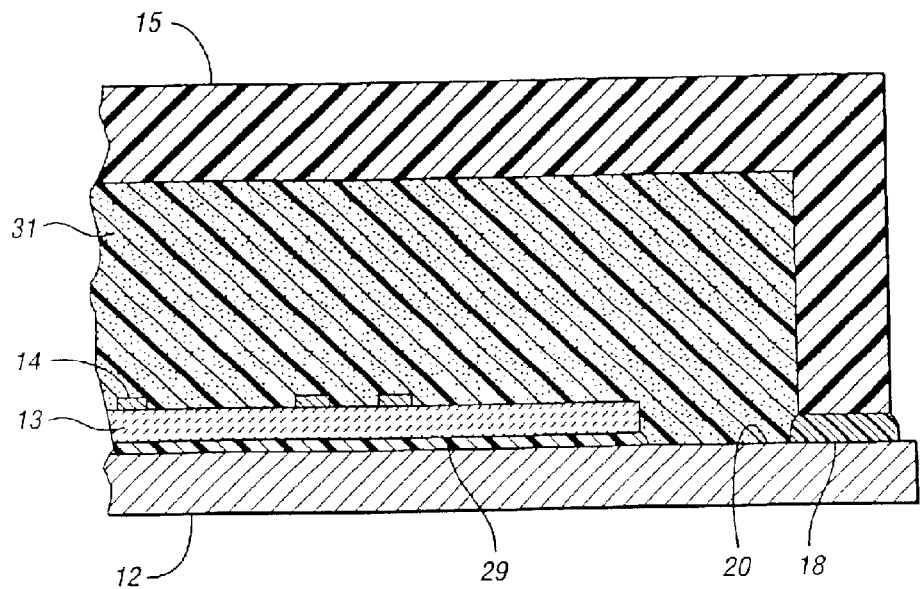
FIG. 2b is a cross-sectional view of the mass fluid flow sensor taken along lines 2b—2b.
Figure 3:
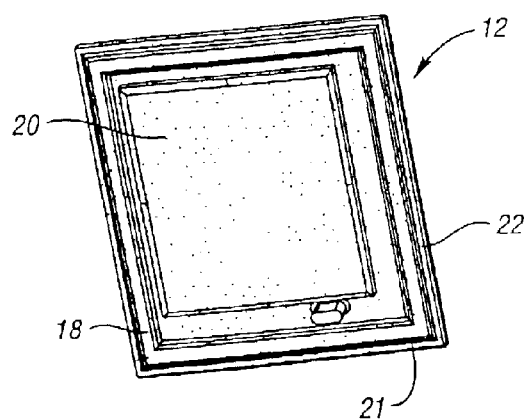
FIG. 3 is an outside view of a base plate or an electronics cover of the mass fluid flow sensor in FIG. 1.

As shown in FIGS. 1–3, base plate 12 has a receiving surface 20 and a circumferential edge 22. Base plate 12 has a protruding ridge 21 extending from the receiving surface 20 adjacent the circumferential edge 22 of base plate 12. Protruding ridge 21 sealingly mates with a corresponding channel (not shown) disposed on housing 15 as further discussed below to create a weather resistant seal. Preferably, base plate 12 functions as a heat sink to draw heat emanating from circuit module 14. Thus, the base plate 12 is made of a first material having a first coefficient of thermal expansion. In this embodiment, the first coefficient of thermal expansion may be between about 5–30 parts per million per degrees Celsius (ppm/degrees C.). The base plate further has a modulus of elasticity at about $5-100 \times 10^6$ pounds per square inch gauge (psig). In this embodiment, the base plate is made of any suitable heat conducting material for transferring heat within the housing. For example, the first material of the base plate may include a metal, a metal allow, a metal matrix composite, or any other suitable material having the first coefficient of thermal expansion and having the modulus of elasticity of the base plate.

As shown in FIGS. 1–3, the device further includes a substrate 13 having a printed circuit or circuit module 14 adhered thereon thereby serving as a printed circuit board as known in the art. As shown, the substrate 13 is disposed on the receiving surface 20 of the base plate 12. The substrate includes a ceramic material, a ceramic matrix composite, glass, or any other suitable material known in the art. In this embodiment, the substrate has a coefficient of thermal expansion between about 0.1–15 ppm-degrees C. and has a modulus of elasticity at about $5-50$ times $10^6$ psig.

The sensor 10 further includes housing 15 including a housing cover 16 attached thereto and a secondary housing cover 17 attached to housing cover 16. As shown, housing 15 includes peripheral side walls 23 oppositely extending from the housing cover 16 and having the corresponding channel (not shown) formed thereon to matingly seal with protruding ridge 21 of base plate 12. Thus, the housing 15 attaches to the receiving surface 20 adjacent the circumferential edge 22. This defines a peripheral interface 24 between the base plate 12 and the housing 15 and encloses the substrate 13 within the housing 15. In this embodiment, the housing 15 is made of a second material having a second coefficient of thermal expansion. The second coefficient of thermal expansion includes a coefficient of thermal expansion ranging up to 80 ppm/degrees C. and having a modulus of elasticity at about $0.01-0.6$ times $10^6$ psig. The housing may include a polymer, a polymer matrix composite, polybutadiene terephthalate (PBT), or any other suitable material having the second coefficient of thermal expansion.

As shown, in FIGS. 1 and 2a, housing 15 further includes an integral connector 30 having connector terminals (not shown) that are in electrical communication with engine operation control electronics external to mass fluid flow sensor 10. The connector terminals are also in electrical communication with the circuit module 14 disposed on the substrate 13 within a central housing portion 34 of the housing 15 Adjacent to central housing portion 34, housing 15 further includes an integrally attached fluid sampling portion 36. Fluid sampling portion 36 includes an inlet 38 that opens into a nozzle 39. Nozzle 39 communicates with a substantially U-shaped flow passage 40. U-shaped flow passage 40 terminates at an outlet 42.

As illustrated in FIG. 2a, a plurality of resistive elements are operatively disposed and supported by housing 15 and are in electrical communication with circuit module 14 via electrical conductors, such as integrally molded leads or terminals. The resistive elements include a hot wire element 44, a cold wire element 46 and an internal fluid temperature (IAT) element 48. Generally, these elements change resistance as a function of temperature.

As shown in FIGS. 2a and 2b, the sensor 10 further includes an adhesive material 18 disposed at the peripheral interface 24 between the circumferential edge 22 and the peripheral side walls 23 to adhere the housing 15 to the base plate 12. In this embodiment, the adhesive material 18 has a predetermined thermal expansion coefficient and a predetermined elastic modulus. The adhesive material 18 serves to reduce fluid ingress through the interface 24 and to accommodate thermal expansions of the first and second materials at ranging temperatures, for example, between about −40° C. and +125° C.

In this embodiment, the adhesive material 18 is preferably a urethane acrylate having a coefficient of thermal expansion of about 100–200 ppm/degrees C. and having an elastic modulus of between about 87,000–150,000 psig when the adhesive material 18 is over its glass transition temperature (Tg). The adhesive material 18 may also have a coefficient of thermal expansion of between about 20–100 ppm/degrees C. and an elasticity modulus of between about 87,000–150,000 psig when the adhesive material 18 is under its glass transition temperature. Of course, the adhesive material 18 may be any other material such as a polymer, so long as the coefficient of thermal expansion and the elasticity modulus are within the predetermined thermal expansion coefficient and elastic modulus discussed above.

In this embodiment, circuit module 14 senses a fluid, such as air flowing through passage 40 by monitoring the power dissipated by the elements. Circuit module 14 may be a single integrated circuit chip or a substrate having discrete, as well as, integrated circuits mounted thereon. The sensed resistance change in the elements is converted to an output signal that is received by the electronic engine control system (not shown). Typically, the electronic engine control system regulates the quantity of fuel injected into the engine by controlling the air to fuel ratio.

In this embodiment, the IAT or element 48 is generally a thermistor or similar device. Element 48 is located on housing 15 to insure an accurate reading of the temperature of the air charge during the induction cycle of the internal combustion engine. As shown in FIG. 2, element 48 is located, preferably, external of passage 40 to minimize the fluid heating effects caused by the heat dissipation from hot element 44.

In one embodiment of the present invention, a fluid flow sensor 10 is provided having elements 44 and 46 made of platinum wire wound resistors. Generally, these elements have a positive temperature coefficient. Thus, any resistive changes in the elements will correspond with a temperature change in the same direction. That is, if the temperature increases, the resistance will increase, and if the temperature decreases, the resistance will decrease.

Figure 4A:
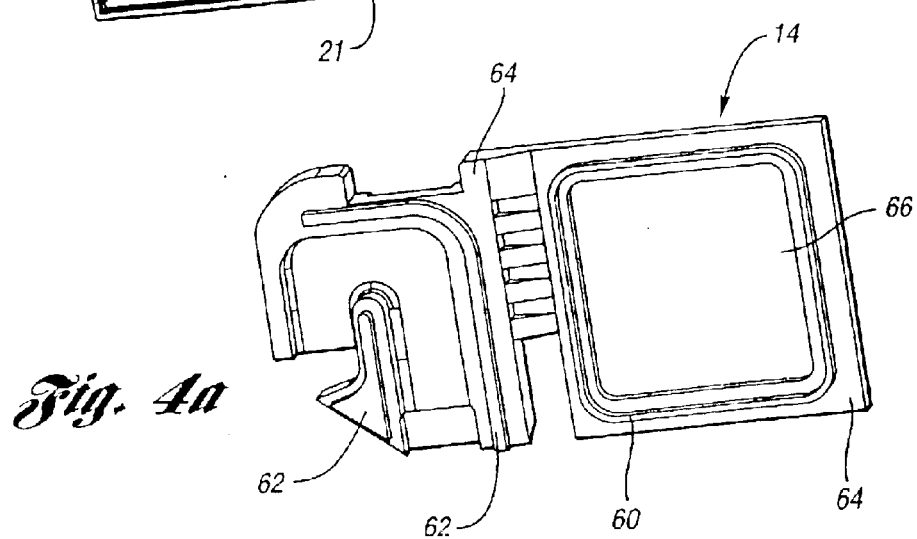
FIG. 4a is an inside perspective view of a mass fluid flow housing cover of the mass fluid flow housing in accordance with one embodiment of the present invention.

Referring now to FIGS. 4a and 4b, a perspective view of housing cover 16 is further illustrated, in accordance with the present invention. FIG. 4a is an inside view of housing cover 16 and FIG. 4b is an outside view of housing cover 16. Housing cover 16 is fixedly joined to housing 15 (as shown in FIG. 4c) along a protruding ridge 60 and 62. Ridge 60 protrudes from an inside surface 64 of housing cover 16 and matingly seals with channel 50 disposed on an inside surface 52 of housing 15. Ridge 62, protruding from an inside surface 64 of housing cover 16, matingly seals with channel 54 disposed within surface 52 and around the perimeter of flow passage 40, thus creating an enclosed and sealed flow passage 40. Housing cover 16 further includes a window aperture 66 for providing access, during manufacture, to integrated circuit 32 (as shown in FIG. 4c). For example, window aperture 66 provides access to integrated circuit 32 during the calibration step in the manufacturing process. Further, as shown in FIG. 4c, integrated circuit 32 is wire bonded using wire bonds to various terminal and/or bonding pads disposed on housing 15.

As shown in FIG. 4b a channel 68 is provided around a perimeter of window 66 to matingly seal the secondary housing cover 16 to housing cover 16. Further, a side opening 70 allows air exiting flow passage 40 to flow out of both side surfaces 72 and of cover 16. A ramped portion 75 is included in surface 72 to funnel and direct air passing over the surface toward cold wire element 46

A perspective inside view of secondary housing cover 17 is illustrated in FIG. 5. Cover 17 includes a perimeter ridge protrusion 80 which matingly seals with housing cover 16 along the perimeter of window 66 and within channel 68. Secondary housing cover 17 is substantially flat and maybe constructed of a heat conductive material, such as a metal for dissipating heat generated by integrated circuit 32. As shown in FIG. 1, secondary housing cover 17 has a generally planar outside surface 84. After cover 19 is positioned on housing cover 16, both the cover 16 and the secondary housing cover 17 create a longitudinally extending and generally planar surface to insure minimal disturbance of the air flowing around sensor 10.

It is to be understood that any other sensor having a printed circuit board design or configuration may be implemented in this embodiment of the present invention, so long as the adhesive material described above is used to reduce contaminant fluid ingress onto the printed circuit board. For example, the sensor discussed in U.S. patent application Ser. No. 10/126,810, filed Apr. 19, 2002 entitled "Fluid Flow Meter Having An Improved Sampling Channel" and U.S. patent application Ser. No. 09/975,112 filed Oct. 11, 2001 entitled "Fluid Flow Meter," both of which are commonly assigned to the same assignee as the present application, are hereby incorporated by reference into the present application.

The present invention provides a method of manufacturing a mass air flow sensor for reducing fluid ingress at a peripheral interface of the mass air flow sensor as described above. The method includes providing a base plate having a receiving surface and a circumferential edge, a substrate having a printed circuit, and a housing as discussed above. The base plate is held on any suitable fixture.

In this embodiment, the method includes dispensing any suitable epoxy on the receiving surface of the base plate and the substrate is bonded on the receiving surface of the base plate. In bonding, preferably a silicon adhesive is dispensed onto the base plate to bond the substrate onto the base plate. Then, wire bonds are connected to bond paths on the substrate defining a printed circuit of the mass air flow sensor.

The method then includes applying an adhesive material on the receiving surface adjacent the circumferential edge of the base plate and disposing the peripheral side walls on the adhesive material to bond the peripheral side walls to the circumferential edge of the base plate. This seals the housing and the base plate at the peripheral interface. As discussed above, the adhesive material has a predetermined thermal expansion coefficient and a predetermined elastic modulus to reduce fluid ingress through the peripheral interface and to accommodate thermal expansion of the base plate and the housing.

The assembly is heated to cure the adhesive material and the epoxy material for about 30 minutes at between about 120° C.–150° C. This may be completed by any suitable means known in the art, such as by heating in a furnace. After cooling to ambient conditions, a silicon gel is dispensed onto the housing on the substrate to fill the central housing portion of the housing. The silicon gel serves as a passivation material and to protect the substrate during normal use of the sensor which may be installed under the hood of a vehicle.

The method of making the sensor allows the housing and the base plate to be sealed with the adhesive material to reduce fluid ingress to the printed circuit board of the substrate. The adhesive material reduces fluid ingress, such as sulfur ingress, into the housing by being capable of allowing the materials of the housing and the base plate to thermally expand during normal use while maintaining bond or adhesive integrity.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A device for detecting a condition of a flowing fluid within a vehicle, the device comprising:

a base plate having a receiving surface and a circumferential edge, the base plate being made of a first material having a first coefficient of thermal expansion;

a substrate having a printed circuit, the substrate being disposed on the receiving surface of the base plate;

a housing including a cover and peripheral side walls extending therefrom, the side walls attaching to the receiving surface adjacent the circumferential edge to define a peripheral interface enclosing the substrate within the housing, the housing being made of a second material having a second coefficient of thermal expansion; and an adhesive material disposed at the interface between the circumferential edge and the peripheral side walls to adhere the housing to the base plate, the adhesive material having a predetermined thermal expansion coefficient and a predetermined elastic modulus to reduce fluid ingress through the interface and to accommodate thermal expansions of the first and second materials.

2. The device of claim 1 wherein the base plate includes a metal, a metal alloy, and a metal matrix composite.

3. The device of claim 1 wherein the base plate is made of a heat conducting material for absorbing heat within the housing.

4. The device of claim 1 wherein the base plate has a coefficient of thermal expansion between about 5–30 parts per million per degree C. (ppm/degree C.).

5. The device of claim 4 wherein the base plate has a modulus of elasticity at 5–100×10$^6$ pounds per square inch gauge (psig).

6. The device of claim 1 wherein the substrate includes a ceramic material, a ceramic matrix composite, and glass.

7. The device of claim 1 wherein the substrate is a printed circuit board.

8. The device of claim 1 wherein the substrate has a coefficient of thermal expansion between about 0.1–15 ppm/degree C.

9. The device of claim 8 wherein the substrate has a modulus of elasticity at $5-50\times10^6$ psig.

10. The device of claim 1 wherein the housing includes a polymer, a polymer matrix composite, and polybutadiene terephthalate.

11. The device of claim 1 wherein the housing has a coefficient of thermal expansion ranging up to 80 ppm/degree C.

12. The device of claim 11 wherein the housing has a modulus of elasticity at $0.01-0.6\times10_6$ psig.

13. The device of claim 1 wherein the adhesive material is a urethane acrylate having a coefficient of thermal expansion of about 100–200 ppm/degree C. and an elasticity modulus of between about 87,000–150,000 psig, when the adhesive material is over its glass transition temperature.

14. The device of claim 1 wherein the adhesive material is a urethane acrylate having a coefficient of thermal expansion of between about 20–100 ppm/degree C. and an elasticity modulus of between about 87,000–150,000 psig when the adhesive material is under its glass transition temperature.

15. The device of claim 1 wherein the adhesive material is a polymer having a coefficient of thermal expansion of between about 100–200 ppm/degree C., when the adhesive material is over its glass transition temperature.

16. The device of claim 15 wherein the adhesive material has an elasticity modulus of between about 87,000–150,000 psig.

17. The device of claim 1 wherein the adhesive material has a coefficient of thermal expansion of between about 20–100 ppm/degree C. when the adhesive material is under its glass transition temperature.

18. The device of claim 17 wherein the adhesive material has an elasticity modulus at about 87,000–150,000 psig.

19. The device of claim 1 wherein the housing includes a secondary cover attached to the housing cover to enclose the substrate within the housing.

20. The device of claim 1 wherein the adhesive material has a predetermined thermal expansion coefficient and a predetermined elastic modulus to accommodate thermal expansions of the first and second materials at temperatures ranging between about −40° C. and +125° C.

* * * * *